United States Patent
Hwang

(10) Patent No.: US 8,489,996 B2
(45) Date of Patent: Jul. 16, 2013

(54) APPARATUS AND METHOD FOR REMOTE CONTROLLING

(75) Inventor: Cheol-Ju Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 936 days.

(21) Appl. No.: 10/951,823

(22) Filed: Sep. 29, 2004

(65) Prior Publication Data

US 2005/0081158 A1 Apr. 14, 2005

(30) Foreign Application Priority Data

Oct. 8, 2003 (KR) .................. 10-2003-0070044

(51) Int. Cl.
*G06F 3/00* (2006.01)
*G06F 15/16* (2006.01)

(52) U.S. Cl.
USPC ............ 715/744; 715/740; 715/747; 709/233

(58) Field of Classification Search
USPC ................. 715/740, 733, 744–748, 778, 781, 715/802, 806–807; 725/141; 709/219, 207, 709/230–237
See application file for complete search history.

(56) References Cited

U.S. PATENT DOCUMENTS

| | | | |
|---|---|---|---|
| 5,349,675 A | 9/1994 | Fitzgerald et al. | ............ 395/800 |
| 6,151,020 A | 11/2000 | Palmer et al. | |
| 6,286,003 B1 | 9/2001 | Muta | |
| 6,329,984 B1 | 12/2001 | Boss et al. | |
| 6,587,125 B1 * | 7/2003 | Paroz | ............... 715/740 |
| 6,738,804 B1 * | 5/2004 | Lo | .................... 709/219 |
| 6,934,740 B1 * | 8/2005 | Lawande et al. | ............. 709/213 |
| 7,000,008 B2 * | 2/2006 | Bautista-Lloyd et al. | ..... 709/219 |
| 7,028,264 B2 * | 4/2006 | Santoro et al. | ................ 715/765 |
| 7,894,474 B1 * | 2/2011 | Bell | ............................. 370/466 |
| 2002/0054044 A1 | 5/2002 | Lu et al. | ........................ 345/536 |
| 2002/0080171 A1 | 6/2002 | Laferriere et al. | |
| 2002/0112004 A1 * | 8/2002 | Reid et al. | ..................... 709/205 |
| 2003/0023987 A1 | 1/2003 | Hiramoto et al. | ............. 725/141 |
| 2003/0221100 A1 * | 11/2003 | Russ et al. | .................... 713/153 |

FOREIGN PATENT DOCUMENTS

| | | |
|---|---|---|
| EP | 0 645 694 | 3/1995 |
| JP | 10-301874 | 11/1998 |
| KR | 10-2001-0022341 | 3/2001 |
| KR | 2003-22842 | 3/2003 |

OTHER PUBLICATIONS

Korean Office Action for corresponding Korea Application 10-2003-0070044; dated Aug. 30, 2010.
European Examination Report issued Sep. 27, 2012 in corresponding European Patent Application No. 04256157.1.

* cited by examiner

*Primary Examiner* — Omar Abdul-Ali
*Assistant Examiner* — Andrew Tank
(74) *Attorney, Agent, or Firm* — Staas & Halsey LLP

(57) ABSTRACT

A remote control apparatus and method. A client-side remote control method includes: receiving characteristic information for each of plural windows from a server; identifying each of the plural windows by referring to the received characteristic information; and transmitting a display update request for the each of the identified windows to the server.

26 Claims, 8 Drawing Sheets

FIG. 3  PRIOR ART

| NUMBER OF BYTES | CHARACTERISTIC INFORMATION |
|---|---|
| 1 | INCREMENTAL |
| 2 | x-POSITION |
| 2 | y-POSITION |
| 2 | WIDTH |
| 2 | HEIGHT |

FIG. 4  PRIOR ART

| NUMBER OF BYTES | CHARACTERISTIC INFORMATION |
|---|---|
| 2 | x-POSITION |
| 2 | y-POSITION |
| 2 | WIDTH |
| 2 | HEIGHT |
| 4 | ENCODING-TYPE |
| N | DISPLAY DATA |

APPARATUS AND METHOD FOR REMOTE CONTROLLING

CROSS-REFERENCE TO RELATED APPLICATION

This application claims the priority of Korean Patent Application No. 2003-70044, filed on Oct. 8, 2003, in the Korean Intellectual Property Office, the disclosure of which is incorporated herein by reference.

BACKGROUND OF THE INVENTION

1. Field of the Invention

The present invention relates to an apparatus and method for remote controlling, and more particularly, to an apparatus and method allowing remote controlling between a client and a server.

2. Description of Related Art

Protocols used for controlling a computer at a remote location include, among others, VNC (Virtual Network Computing) and RDP (Remote Desktop Protocol).

A basic concept of these protocols enables the output and input devices of a computer at a user location to be used like the output and input devices of a computer at a remote location. For implementing this protocol, it is necessary to reproduce a screen of a computer at a remote location on a screen of a computer at a user location.

FIG. 1 is a view for describing how a conventional remote control apparatus operates.

Referring to FIG. 1, the conventional remote control apparatus includes a client 1 and a server 2. A computer at a user location is called a Client since it sends a display update request, and a computer at a remote location is called a Server since it provides display information in response to the display update request. Hereinafter, the computer at the user location is referred to as a client and the computer at the remote location is referred to as a server.

A user performs desired control operations (for example, keyboard inputs, mouse clicks, etc.) while viewing a screen of the server 2 reproduced on a screen of the client 1. Control information according to the user's control operations is transmitted to the server 2 via a network. The server 2 processes this control information and transmits information of a changed screen as the processed result to the client 1 via the network. In a VNC protocol, a client for remote controlling is called a "Thin Client," which is a client that reduces its size and weight for portability and only has indispensable functions for remote controlling in order to reduce cost. A remote control protocol for the thin client, such as VNC, is a communication standard allowing the interchange of display information and control information between the client 1 and the server 2. The remote control protocol for the thin client mainly consists of transmitting a display update request and control information from the client 1, and transmitting display information from the server. The client's capability for reproducing a screen of the server 2 depends on the network speed between the server 2 and the client 1, processing capacities of the server 2 and the client 1, effectiveness of data interchange, etc. To reduce the amount of data transmission between the server 2 and the client 1, encoding/decoding can be used. In this case, the server 2 includes an encoder and the client 1 includes a decoder. However, since the thin client generally has only indispensable functions, such an encoding/decoding method accompanying a large amount of calculations is not adopted therein. Instead, contents contained in a frame buffer of a server are transferred to a client, which is called "Raw Encoding" or very simple encoding/decoding, for example, "Copy Rectangle Encoding" is used.

FIG. 2 is a view for describing a display update method according to a conventional remote control protocol.

Referring to FIG. 2, a screen of a client 1 is updated according to a conventional remote control protocol as follows.

If the client 1 is connected to a server 2 via a network and basic data is interchanged between the client 1 and the server 2, the client 1 sends a display update request to the server 2 periodically or when an input event is generated. The server 2 transmits display information to the client 1 in response to the display update request. The client 2 reproduces a screen of the server 2 on its own display panel using the display information. At this time, the display update request is not always in a one-to-one correspondence with the display information transmission. That is, the server 2 can transmit the display information in response to a display update request, can transmit the display information in response to a specified set of display update requests, or can ignore the display update requests, according to its discretion. If the client 1 sends no display update request, the server 2 transmits no display information.

FIG. 3 shows a format of a display update request message according to a conventional remote control protocol.

Referring to FIG. 3, a display update request message according to VNC (Virtual Network Computing), a conventional remote control protocol, includes an incremental field, screen location fields (x-position and y-position), and screen size fields (width and height).

A client 1 requests display updating using the display update request message of FIG. 3. The client 1 designates the location and size of a screen to be updated, and designates whether the entire area of the screen should be updated or whether only a specified portion (to be changed) of the screen should be updated, using the incremental field.

FIG. 4 shows a format of a display information message according to a conventional remote control protocol.

Referring to FIG. 4, a display information message according to VLC, as a conventional remote control protocol, includes screen location fields (x-position and y-position), screen size fields (width and height), an encoding type field, and a display information field.

If a client 1 receives the display information message from a server 2, the client 1 checks values recorded in the screen location fields and the screen size fields of the display information message, decides an area of a screen to be updated, and displays the values recorded in the display information field on the decided area. If a value recorded in the encoding type field of the display information message represents raw encoding, the client 1 copies the value recorded in the display information field to its own frame buffer to reproduce a screen of the server 2. If a value recorded in the encoding type field represents encoding, the client 1 performs decoding and stores the decoded value in its own frame buffer, thereby reproducing a screen of the server 2.

As described above, since the client 1 receives only display information for a requested area from the server 2, the conventional remote control method has the following problems. First, in the client 1, a user can designate a specific area and request display updating only for the specific area, however, it is inconvenient in that the user him/herself must designate areas to be updated individually. Furthermore, whenever a window in an area to be updated moves to another location, the user should redesignate the area. Second, since the client 1 has no information for applications being operated in the server, the client 1 cannot provide to the server 2, reference information regarding how frequently a window screen should be updated for each application. For example, when a moving image is being reproduced on a window of an application being operated in the server 2, the client 1 should request display updating very frequently. If the operating application is an application for responding to a user input, the client 1 requests display updating only whenever there is the user input. However, in the conventional technique, since display updating is requested whenever there is a user input or per a specified period, the display update frequency is too low to reproduce moving images and is too high to reproduce still images. Therefore, in a case of reproducing moving images, smooth reproduction cannot be achieved, and in a case of reproducing still images, the same screen as the previous screen can be repeatedly updated. Third, a display update request for a specific portion of a screen is allowable, however, it is impossible to stop display updating. For example, when a user of a client 1 controls a certain application and a window of the application covers a portion of a screen, it is nearly impossible to send a request to stop updating the covered portion to the server 2. Fourth, when two applications are being operated in the server 2, it is assumed that a user of the client 1 takes an interest in one application and no interest in the other application. In this case, the client 1 will focus all its resources on the application of the user's interest and will process the other application if any remaining resources exist. In the conventional technique as described above, it is impossible to allocate resources to each application according to a user's designation.

BRIEF SUMMARY

An embodiment of the present invention provides an apparatus and method capable of efficiently transmitting display information being remotely controlled via a network, by allowing a client to identify windows individually.

According to an aspect of the present invention, there is provided a client-side remote control method including: receiving characteristic information for each of plural windows from a server; identifying each of the plural windows by referring to the received characteristic information; and transmitting a display update request for the each of the identified windows to the server.

According to another aspect of the present invention, there is provided a server-side remote control method including: transmitting characteristic information for each of plural windows to a client; receiving a display update request for the each of the plural windows from a client which received the transmitted characteristic information; and transmitting display information for each of the plural windows according to the received display update request.

According to still another aspect of the present invention, there is provided a remote control apparatus including: a server which transmits characteristic information for each of plural windows included in a screen displayed on a display panel; and a client which identifies each of the plural windows with reference to the characteristic information transmitted from the server and which transmits a display update request for each of the identified windows. The server transmits display information for each of the plural windows in response to the transmitted display update request.

According to yet another aspect of the present invention, there is provided a computer-readable medium having embodied thereon a computer program for executing a client-side remote control method.

According to further aspect of the present invention, there is provided a computer-readable medium having embodied thereon a computer program for executing a server-side remote control method.

According to another aspect of the present invention, there is provided a system which reduces an amount of data transmission during remote controlling of a client via a network, including: a client which identifies at least one window using at least one window identifier and transmits a display update request for each identified window; and a server which transmits the at least one window identifier to the client, without transmitting window location and size information, receives at least one display update request from the client, and transmits display information according to the received at least one display update request.

According to another aspect of the present invention, there is provided a remote control method, including: transmitting characteristic information for each of one or more windows; identifying each of the windows with the received characteristic information; transmitting a display update request for each window in each display update request period based on the characteristic information; receiving the display update request and transmitting first display information for each window in response to the display update request; transmitting a display update stop request for the decided specific portion; and stopping display information transmission for the specific portion in response to the display update stop request; transmitting the received resource allocation information; transmitting second display information for each window with allocated resources is transmitted at a frequency proportional to the allocated resources; receiving the first and the second display information and displaying a screen including each of the windows using the received display information; and receiving and transmitting control information for applications corresponding respectively to the displayed windows.

According to another aspect of the present invention, there is provided a method of reducing an amount of data transmission during remote control of clients via a network, including: receiving characteristic information for each of plural windows; identifying each of the plural windows by referring to the received characteristic information; transmitting a display update request for each of the identified windows; transmitting characteristic information for each of the plural windows; receiving a display update request for each of the plural windows; and transmitting display information for each of the plural windows according to the received display update request.

According to still another aspect of the present invention, there is provided a method of optimizing a display environment, including: receiving characteristic information for each of plural windows from a server; identifying each of the plural windows by referring to the received characteristic information; recognizing types of content being reproduced in each of the identified windows; and transmitting display update requests for each of the identified windows to the server based on the types of content.

According to still another aspect of the present invention, there is provided a method of allocating resources to plural display windows based on a user input, including: receiving characteristic information for each of plural windows; identifying each of the plural windows by referring to the received characteristic information; recognizing types of content being reproduced in each of the identified windows; transmitting a display update request for each of the identified windows; transmitting characteristic information for each of the plural windows; receiving a display update request for each of the plural windows; and transmitting display information for each of the plural windows according to the received display update request. Based on the user input and the types of content recognized, display update requests for at least one of the identified windows is more frequently transmitted than for others of the identified windows.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 shows a format of a display update request message according to a conventional remote control protocol;

FIG. 4 shows a format of a display information message according to a conventional remote control protocol;

DETAILED DESCRIPTION OF EMBODIMENTS

Figure 1:
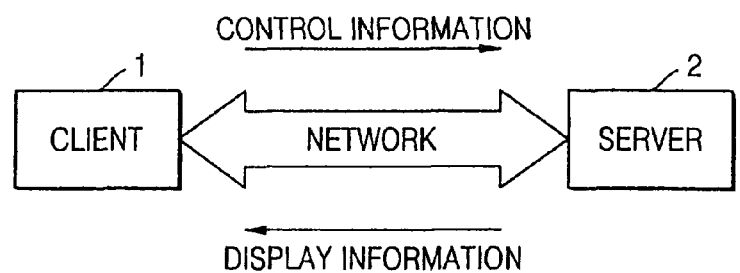
FIG. 1 is a view for describing how a conventional remote control apparatus operates.
Figure 2:
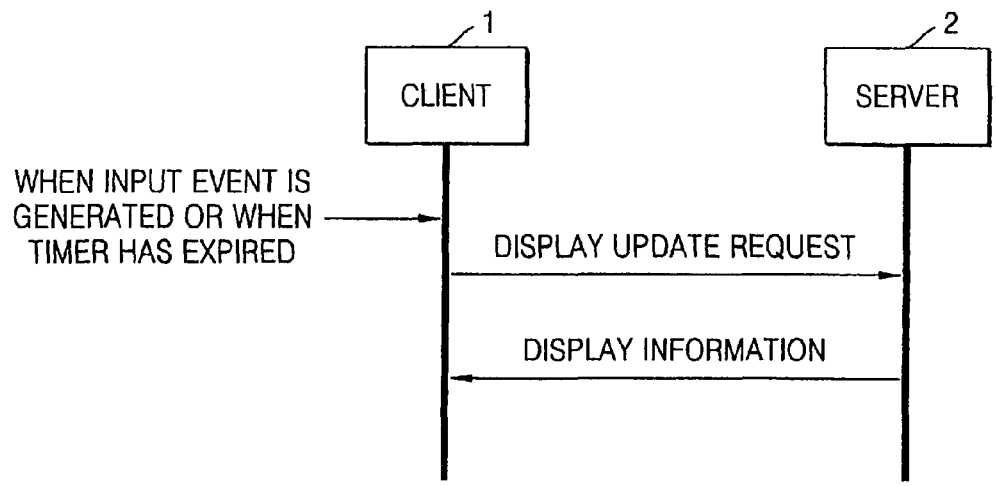
FIG. 2 is a view for describing a display update method according to a conventional remote control protocol.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
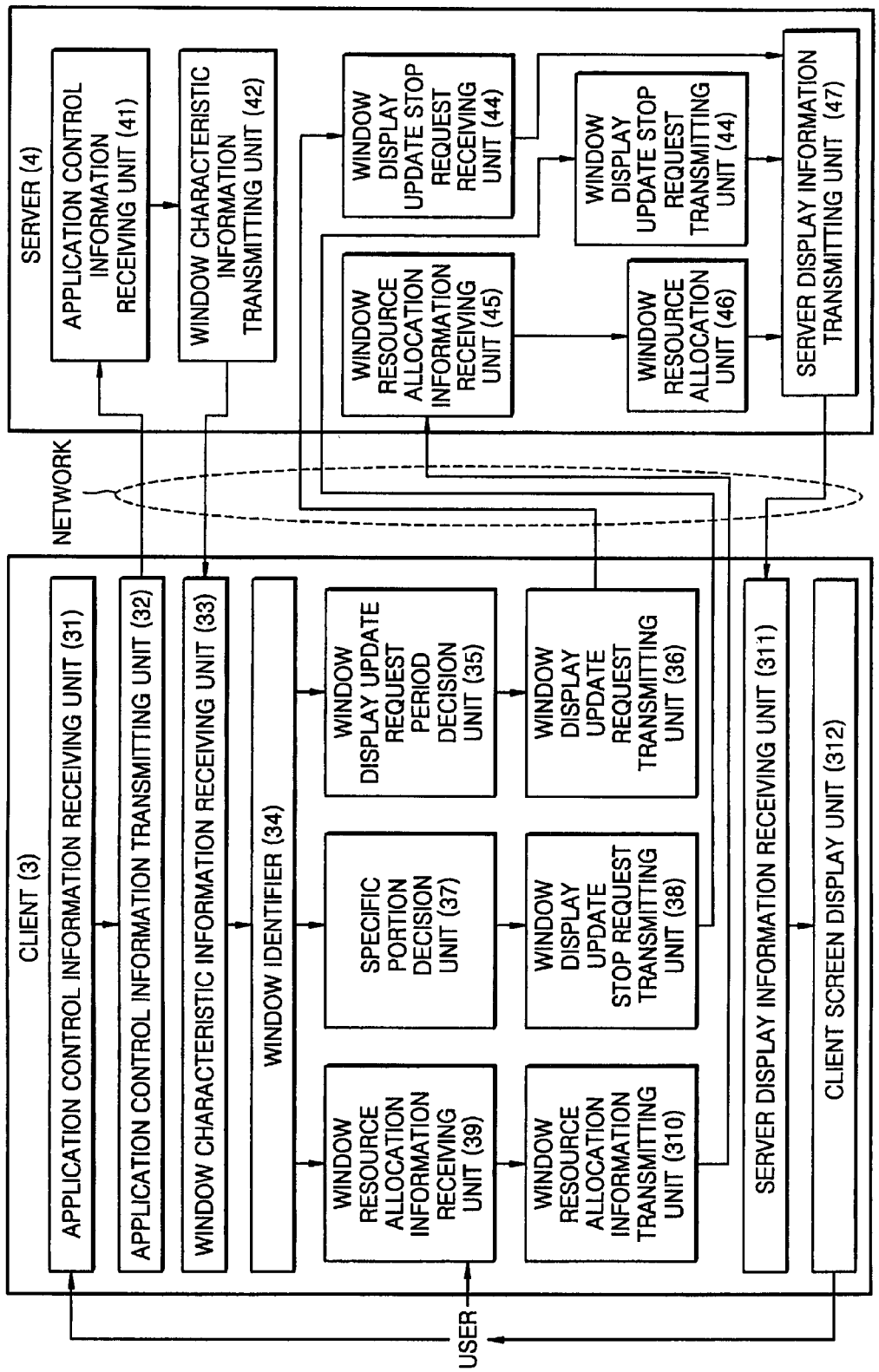
FIG. 5 is a block diagram of a remote controlling apparatus according to an embodiment of the present invention.

FIG. 5 is a block diagram of a remote controlling apparatus according to an embodiment of the present invention.

Referring to FIG. 5, the remote controlling apparatus includes a client 3 and a server 4.

The client 3 receives control information for applications, each corresponding to windows displayed on a display panel of the client 3, from a user, and transmits the received control information. Here, the user performs specified operations while viewing the respective windows displayed on the display panel of the client 3 using a keyboard or a mouse, thereby controlling the applications corresponding to the respective windows. At this time, control information for the applications is transmitted to the server 4 via a network.

The server 4 receives the transmitted control information and transmits characteristic information corresponding to each of the applications controlled according to the control information. Here, the server 4 receives control information such as a keyboard event or mouse event from the client 3 and controls a corresponding application according to the received control information. As the controlled result, the application is changed, and accordingly, the window that displays this changed application is changed. That is, a new window can be created on the entire screen or on a portion of the screen, the existing window occupying the entire screen or the existing portion of the screen can disappear, or the location or size of the existing window can be adjusted. The server 4 transmits characteristic information for such a changed window to the client 3. Here, the characteristic information includes a window ID for identifying a window, window variation information representing a changed level of a window screen, window location information representing where the window is located in the entire screen of the display panel, and window size information representing the amount of area the window occupies on the entire screen of the display panel.

The client 3 receives the characteristic information and identifies a window by referring to the characteristic information. Here, the client 3 identifies a window by referring to the window location information and window size information included in the characteristic information. To use a window ID with a very small amount of data, instead of the window location information and the window size information when the client 3 identifies a window, the client 3 corresponds a window ID to a window identified by referring to the window location information and the window size information. That is, the client 3 identifies the window by the window ID included in the characteristic information. As such, each window included in the screen can be identified using only their window IDs. Therefore, it is unnecessary for a user him/herself to designate window areas individually. Also, since a window is identified by its ID, although the location or size of the window is changed, it is unnecessary for the user to newly designate the changed portion. Further, when information is interchanged between the client 1 and the server 2, since only a window ID is used instead of the window location information and the window size information, the amount of data transmission is reduced.

The client 3 decides a display update request period for each window identified with reference to the characteristic information, and transmits a display update request for each of the windows for each of the display update request periods. That is, the client 3 determines whether the window is a window for reproducing general moving images, whether the window is a window for reproducing repetitively moving images, or whether the window is a window for reproducing still images, with reference to the window variation information included in the characteristic information, and decides a display update request period based on the determined result. If the window is the window for reproducing the general moving images, the display update request period will be short. If the window is the window for reproducing the still images, the display update request period will be long. Also, if the window is the window for reproducing the repetitively moving images, the length of the display update request period will be between that of the general moving images and that of the still images. If the window is a window for responding to input events, the display update request period will be unnecessary. Then, the client 3 transmits a display update request for each of the windows to the server 4 for each of the decided display update periods. The server 4 receives the display update request and transmits display information for each of the windows to the client 3 in response to the display update request. The client 3 receives the display information and displays a screen including each of the windows using the received display information. Then, the client 3 receives control information for applications corresponding to the respective windows included in the displayed screen, from a user, and transmits the received control information.

Also, the client 3 decides a specific portion where display updating is not required for each of the windows with reference to the characteristic information, and transmits a request to stop display updating for the decided specific portion to the server 4. The client 3 checks correlations of the windows with the window location information and the window size information included in the characteristic information, decides a specific portion not requiring display updating, that is, a portion covered by another window based on the checked correlations, and sends a display update stop request for stopping the transmission of display information for the decided specific portion to the server 4. The server 4 stops transmitting display information for the specific portion in response to the received display update stop request.

Also, the client 3 receives resource allocation information for each of the windows identified by the user and transmits the received resource allocation information to the server 4. The user inputs resource allocation information for each of the windows, using an input device such as a keyboard and a mouse, to receive a high-quality screen for a window of his/her interest among several windows displayed on the display panel of the client 3. The client 3 transmits the resource allocation information to the server 4. The server 4 that receives the resource allocation information, allocates resources to each of the windows included in the displayed screen according to the resource allocation information, and transmits display information for each window in a frequency proportional to the allocated resource. The client 3 receives the display information, displays a screen including the windows using the display information, receives control information corresponding to the respective windows included in the displayed screen from the user, and transmits the received control information to the server 4.

Referring to FIG. 5, a remote controlling apparatus of the client 3 includes an application control information receiving unit 31, an application control information transmitting unit 32, a window characteristic information receiving unit 33, a window identifier 34, a window display update request period decision unit 35, a window display update request transmitting unit 36, a specific portion decision unit 37, a window display update stop request transmitting unit 38, a window resource allocation information receiving unit 39, a window resource allocation information transmitting unit 310, and a server display information receiving unit 311, and a client screen display unit 312.

Figure 6:
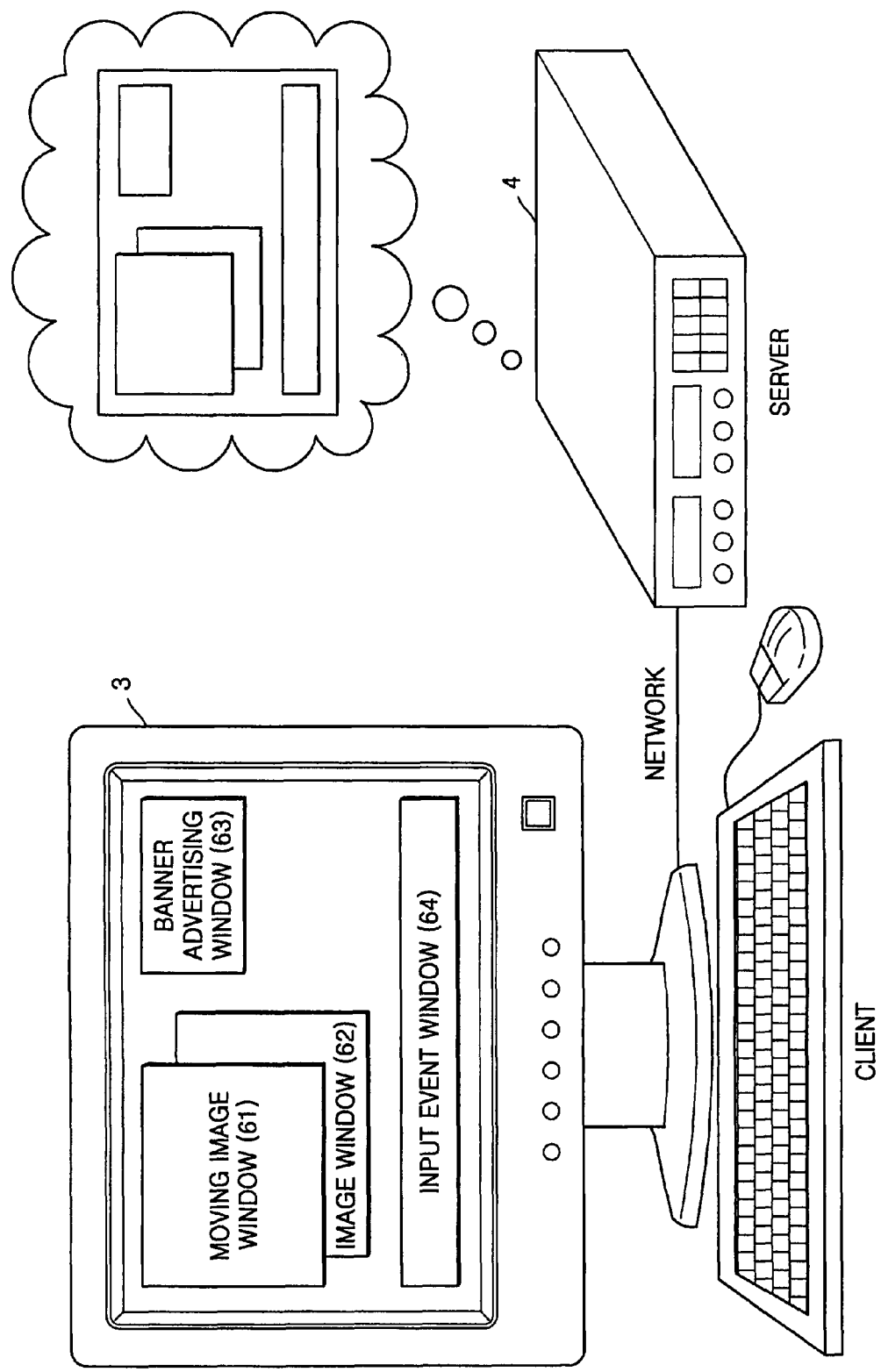
FIG. 6 illustrates an example of a remote controlling environment to which the remote controlling apparatus of FIG. 5 is applicable.

FIG. 6 illustrates an example of a remote controlling environment to which the present embodiment is applicable.

Referring to FIG. 6, a screen displayed on the display panel of the client 3 includes a moving image window 61 that reproduces moving images, an image window 62 which reproduces still images, a banner advertising window 63 which reproduces repetitively moving images, and a window 64 for responding to input events.

Referring to FIGS. 5 and 6, the application control information receiving unit 31 receives control information for applications corresponding to the respective windows included in the screen displayed on the display panel of the client 3, from the user. The screen shown in FIG. 6 is a screen displayed on the display panel of the client 3. The user inputs the control information using a keyboard, a mouse, etc. while viewing the screen displayed on the display panel of the client 3. The application control information transmitting unit 32 transmits the control information received from the application control information receiving unit 31 to the server 4 via a network. The window characteristic information receiving unit 33 receives characteristic information for each window from the server 4 which receives the control information from the application control information transmitting unit 32.

Figure 7:
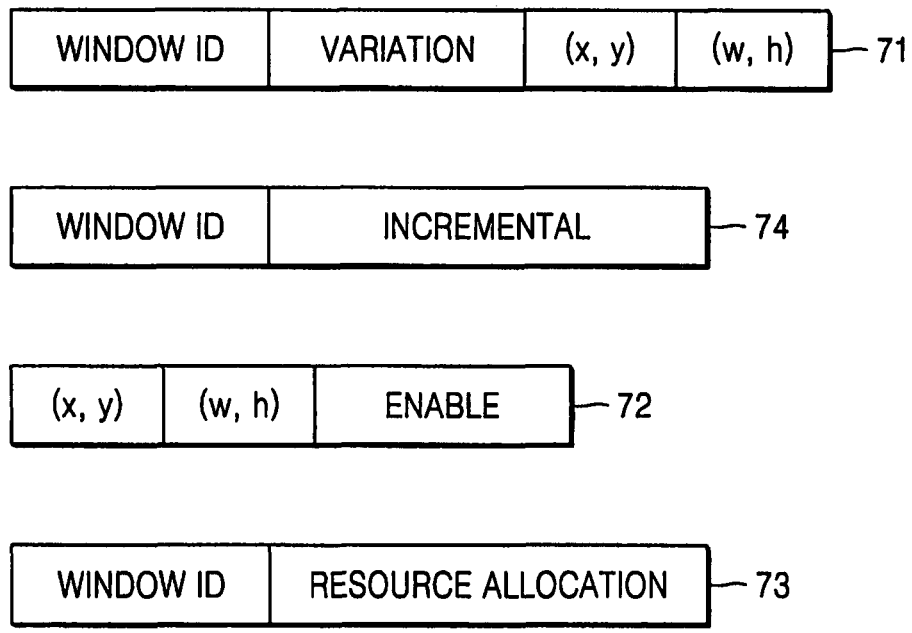
FIG. 7 shows examples of various message formats usable in the present embodiment.

FIG. 7 shows examples of various message formats usable in the present embodiment.

Referring to FIG. 7, a window characteristic information message 71 includes a window ID field, a window variation field, a window location (x, y) information field, and a window size (w, h) information field. Here, the window ID field stores a window ID value, the widow variation information field stores a variation information value of a window with the window ID stored in the widow ID field, the window location information field stores a coordinate value (x, y) at the top of the window, and the window size information field stores a width and height value (w, h) of the window. If (w, h)=(0, 0), this represents that there is no window with the window ID stored in the window ID field. The window characteristic information receiving unit 33 receives a window characteristic information message 71 including a window ID, window variable information, window location information, and a window size information from the server 4 via a network.

Referring to FIGS. 5-7, the window identifier 34 identifies a window with reference to the characteristic information received from the window characteristic information receiving unit 33. The window identifier 34 identifies a window by a window ID included in the window ID field, by referring to the window location information stored in the window location information field and the window size information stored in the window size information field included in the received window characteristic information message 71. In the example of FIG. 6, a moving image window 61 is identified by a window ID 00, an image window 62 is identified by a window ID 01, a banner advertising window 63 is identified by a window ID 10, and an input event window 64 is identified by a window ID 11.

The window display update request period decision unit 35 decides a display update request period for each of the windows identified by the window identifier 34, with reference to the characteristic information received from the window characteristic information receiving unit 33. The window display update request period decision unit 35 decides a display update request period for each window with reference to the window variation information stored in the window variation information field included in the received window characteristic information message 71. In the example of FIG. 6, the window display update request period decision unit 35 decides a short display update request period for the moving image window 61 with the window ID 00, decides a long display update request period for the image (still image) window 62 with the window ID 01, decides a display update request period for the banner advertising window 63 with the window ID 10, to a middle length of the display update request period of the moving image window 61 and that of the still image window 62, and does not decide any screen request period for the input event window 64 with the window ID 11.

Referring to FIG. 7, the display update request message 71 includes a window ID field and an incremental field. Here, the incremental field stores a value requesting to update the entire screen of a window with a window ID stored in a window ID field or to update only a changed portion of the window screen.

The window display update request transmitting unit 36 transmits a display update request for each of the windows identified by the window identifier 34 to the server 4, in each display update request period decided by the window display update request period decision unit 35 with reference to the characteristic information received from the window characteristic information receiving unit 33. Here, the window display update request transmitting unit 36 checks correlations of each of the windows by referring to the window location information stored in the window location information field and the window size information stored in the window size information field included in the received window characteristic information message 71.

In the example of FIG. 6, the window display update request transmitting unit 36 checks the correlations of the windows to see that the moving image window 61 with the window ID 00 covers the top portion of the image window 62, the banner advertising window 63 is independently located at a upper right portion of the screen, and the input event window 64 with the window ID 11 is independently located at the bottom portion of the screen. When display information for an updated portion of a first window among the windows identified from the checked correlations is required, the window display update request transmitting unit 36 transmits a first display update request message including a value (for example, "1") requesting to update only the changed portion of the window screen in the incremental field thereof, wherein the first display update request message includes a window ID of the first window and a display information request of the updated portion of the first window. When display information for the entire area of a second window among the identified windows is required, the window display update request transmitting unit 36 transmits a second display update request message including a value (for example, "0") requesting to update the entire window in the incremental field thereof, wherein the second display update request message includes a window ID of the second window and a display information request for the entire area of the second window. Generally, to efficiently transmit data, the first display update request message as a display information request for a updated portion of a window is transmitted. However, if display information for an entire window area is required, the second display update request message acting as a display information request for an entire area of a window is transmitted. In the example of FIG. 6, if the moving image window with the window ID 00 moves to the left-upper location under the control of a user, the covered upper-left portion of the image window 62 with the window ID 01 is shown. In this case, since there is no display information for the shown portion, a second display update request message for the image window 62 with the window ID 01 should be transmitted.

The specific portion decision unit 37 decides a specific portion not requiring screen updating for each of the windows identified by the window identifier 34 by referring to the characteristic information received from the window characteristic information receiving unit 33. Here, the specific portion decision unit 37 checks correlations of each of the windows identified with reference to the window location information and the window size information included in the characteristic information, and decides a specific portion not requiring screen updating for each of the windows based on the checked correlations. In the example of FIG. 6, the specific portion decision unit 37 checks the correlations of the windows to see that the moving image window 61 with the window ID 00 covers the left-upper portion of the image window 62 with the window ID 01, the banner advertising window 63 with the window ID 10 is independently located at the upper-right location of the screen, and the input event window 64 with the window ID 11 is independently located at the bottom location of the screen. The specific portion decision unit 37 decides that the covered upper-left portion of the image window 62 with the window ID 01 is not a specific portion requiring screen updating, based on the checked correlations Referring to FIG. 7, a display update stop request message 72 includes a specific portion location information (x, y) field, a specific portion size information (w, h) field, and an enable field. Here, the specific portion location information field stores a coordinate value (x, y) at the upper-left location of a specific portion, the specific portion size information field stores a width and height value (w, h) of the specific portion, and the enable field stores a value requesting to stop display updating of the specific portion.

The window display update stop request transmitting unit 38 transmits a display update stop request for the specific portion decided as not requiring updating by the specific portion decision unit 37. Here, the window display update stop request transmitting unit 38 transmits a display update stop request message, including a value (for example, '0') requesting to stop updating of the window screen, in the enable field thereof, wherein the display update stop request message includes the location of the specific portion, the size of the specific portion, and a display update stop request for the specific portion.

The window resource allocation information input unit 39 receives resource allocation information for each of the windows identified by the window identifier 34, from a user. Here, the resource allocation information is information indicating how resources, such as data transmission capability and processing capability, are allocated to each window. If 100% of the resources is allocated to a window, the server 4 sends display information frequently for only this window. If 0% is allocated to a window, the server 4 does not send any display information for this window. If x % is allocated to any one among N windows, a resource of (100−x)/(N−1) % is allocated respectively to the remaining N−1 windows by the server 4.

Referring to FIG. 7, a resource allocation information message 73 includes a window ID field and a resource allocation field. Here, the resource allocation information field stores a percent value of the resources allocated to a window with a window ID stored in the window ID field.

The window resource allocation information transmitting unit 310 transmits the resource allocation information received from the window resource allocation information input unit 39. Here, the window resource allocation information transmitting unit 310 transmits a resource allocation information message 73 including a window ID and resource allocation information for a window with the window ID. In the example of FIG. 6, if a user is interested in only the moving image window 61 with the window ID 00, the user allocates 100% of the resources to the moving image window 61 using an input device such as a keyboard or a mouse. Thus, no resources will be allocated to the image window 62 with the window ID 01, the banner advertising window 63 with the window ID 10, and the input event window 64 with the window ID 11. Such resource allocation information is included in the resource allocation information message 73 and transmitted to the server 4.

The server display information receiving unit 311 receives display information for each of the windows from the server 4, which has received the display update request received from the window display update request transmitting unit 35, or the window resource allocation information received from the window resource allocation information transmitting unit 310. The client screen display unit 312 displays a screen including the windows using the display information received from the server display information receiving unit 311.

Referring to FIG. 5, a remote control apparatus of the server 4 includes an application control information receiving unit 41, a window characteristic information transmitting unit 42, a window display update request receiving unit 43, a window display update stop request receiving unit 44, a window resource allocation information receiving unit 45, a window resource allocation unit 46, and a server display information transmitting unit 47.

The application control information receiving unit 41 receives control information for applications each corresponding to a window from a client 3. The window characteristic information transmitting unit 42 transmits characteristic information for windows corresponding to the respective applications controlled according to the control information received by the application control information receiving unit 41. Here, the window characteristic information transmitting unit 42 transmits a window characteristic information message 71 (shown in FIG. 7) including a window ID, window variation information, window location information, and window size information to the client 3 via a network.

The window display update request receiving unit 43 receives a display update request for each of windows from the client 3 which has received the characteristic information transmitted from the window characteristic information transmitting unit 42. Here, the window update request receiving unit 43 receives a first display update request message of the format of message 74 including a first window ID and a display update request for a portion to be updated, and a second display update request message of the format of message 74 including a second window ID and a display update request for the entire screen. At this time, the sever display information transmitting unit 47 transmits display information for each of the windows in response to the display update request received by the window display update request receiving unit 43. Here, the server display information transmitting unit 47 transmits display information for a portion to be updated in the first window with the first window ID included in the received first display update request message, and transmits display information for the entire area of the second window with the second window ID included in the received second display update request message.

The window display update stop request receiving unit 44 receives a display update stop request for a specific portion from a client which receives the characteristic information transmitted from the window characteristic information transmitting unit 42. Here, the window display update stop request receiving unit 44 receives a display update stop request message 72 including a location of the specific portion, a size of the specific portion, and a display update stop request. At this time, the server display information transmitting unit 47 stops transmitting the display information for the specific portion according to the display update stop request received by the window display update stop request receiving unit 44. Here, the server display information transmitting unit 47 stops transmitting display information for the specific portion having the location and the size of the specific portion included in the received display update stop request message 72.

The window resource allocation information receiving unit 45 receives resource allocation information for each of the windows from the client 3, which receives the characteristic information transmitted by the window characteristic information transmitting unit 42. Here, the window resource allocation information receiving unit 45 receives a resource allocation information message 73 including a specified window ID and resource allocation information for a window with the window ID. The window resource allocation unit 46 allocates resources to each of the windows according to the resource allocation information received by the window resource allocation information receiving unit 45. Here, the window resource allocation unit 46 allocates resources according to the resource allocation information included in the received resource allocation information message 73, to the window with the window ID included in the resource allocation information message 73 received by the window resource allocation information receiving unit 45. At this time, the server display information transmitting unit 47 transmits display information for each window with allocated resources at a frequency proportional to the allocated resources. In the example of FIG. 6, if a resource allocation information message 73 including information indicating that 100% of the resources is to be allocated to the moving image window 61 with the window ID 00, is received, 100% of the resources is allocated to the moving image window 61 with the window ID 00 and no resources are allocated to the image window 62 with the window ID 01, the banner advertising window 63 with the window ID 10, and the input event window 64 with the window ID 11. Accordingly, only display information of the moving image window 61 to which the 100% of the resources have been allocated is transmitted frequently to the client 3, using all of the resources of the server 4.

The application control information receiving unit 41 again receives control information for each application corresponding to a window from the client 3, which receives the display information transmitted by the server display information transmitting unit 47.

Figure 8:
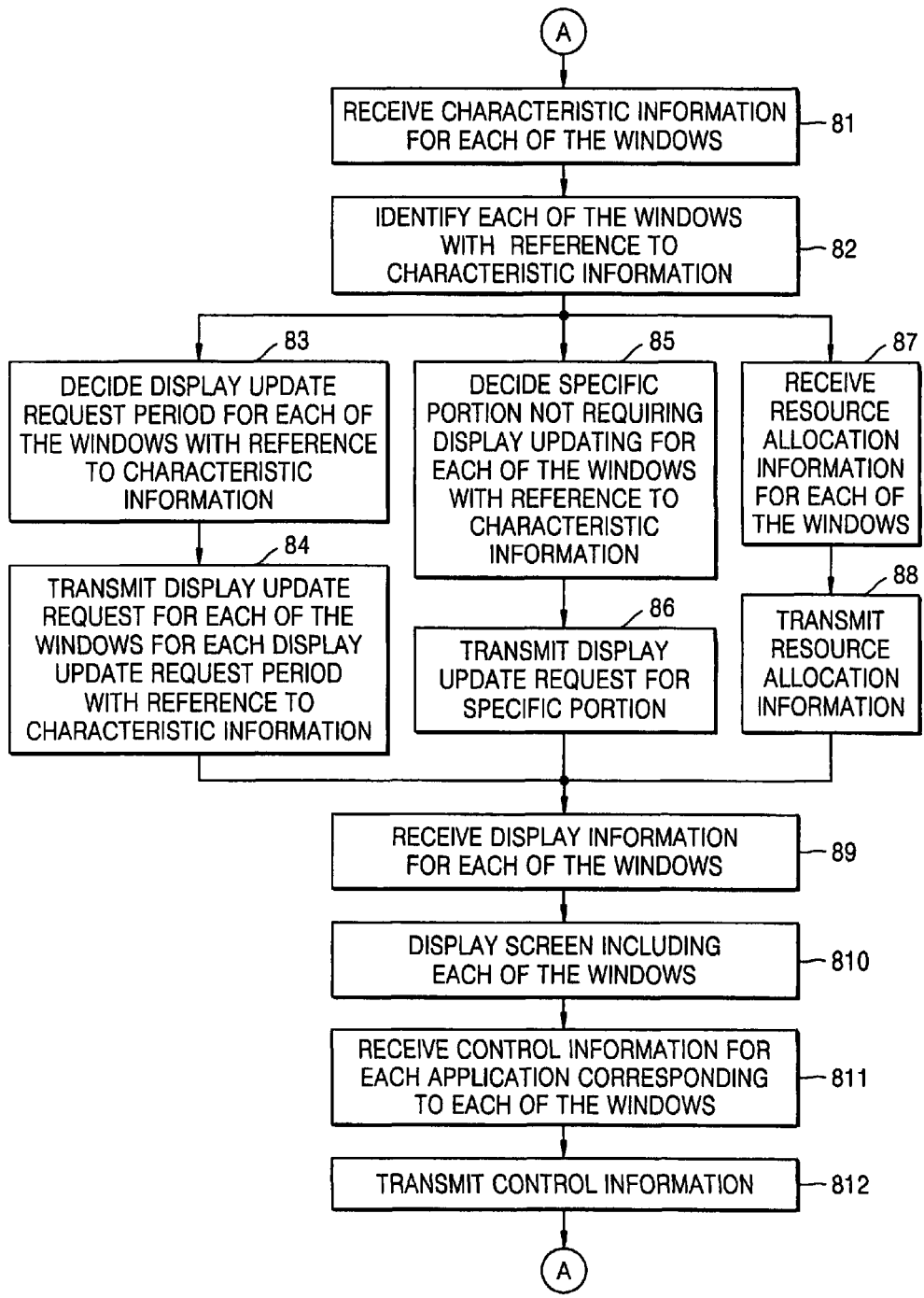
FIG. 8 is a flowchart illustrating a client-side remote controlling method according to an embodiment of the present invention.

FIG. 8 is a flowchart illustrating a client-side remote control method according to an embodiment of the present invention.

Referring to FIG. 8, the client-side remote control method includes multiple operations.

Characteristic information for each window is received from a server in operation 81. Here, a window characteristic information message including a window ID, window variation information, window location information, and window size information is received. Successively, each of the windows is identified with reference to the received characteristic information in operation 82. Here, each of the windows is identified by window IDs included in the received characteristic information, with reference to the window location information and the window size information included in the characteristic information. Then, a display update request period for each of the windows identified with reference to the characteristic information is decided in operation 83. Then, a display update request for the identified window is transmitted in each display update request period decided with reference to the characteristic information in operation 84. Here, a display update request period is decided for each window with reference to the window variation information included in the characteristic information. The correlations of the identified windows are checked with reference to the window location information and the window size information included in the characteristic information. If display information for a portion of a first window to be updated among the identified windows is required according to the checked correlations, a first display update request message including a window ID of the first window and a display information request for the portion (to be updated) of the first window is transmitted. If display information for the entire area of a second window among the identified windows is required, a second display update request message including a window ID of the second window and a screen information request for the entire area of the second window is transmitted.

Alternately, a specific portion not requiring display updating for the identified windows is decided with reference to the characteristic information in operation 85. Successively, a request to stop display updating for the decided specific portion is transmitted in operation 86. Here, correlations of the identified windows are checked with reference to the window location information and the window size information included in the characteristic information. A specific portion not requiring display updating for each of the windows is decided based on the checked correlations. Then, a display update stop request message including a location of the specific portion, a size of the specific portion, and a display update stop request for the specific portion, is transmitted.

Alternately, resource allocation information for each of the windows is received from a user in operation 87 and the resource allocation information is transmitted in operation 88. Here, a resource allocation information message including a specified window ID and resource allocation information for a window with the window ID is transmitted.

Next, display information for each of the windows is received from a server that has received the display update request or the window resource allocation information in operation 89. Thereafter, a screen including the windows is displayed using the display information in operation 810. Then, control information for applications corresponding to the respective windows included in the displayed screen is received from a user. Successively, the control information is transmitted to the server in operation 812. Then, the above-described processes are repeated while receiving characteristic information for the respective windows from the server that receives the control information.

Figure 9:
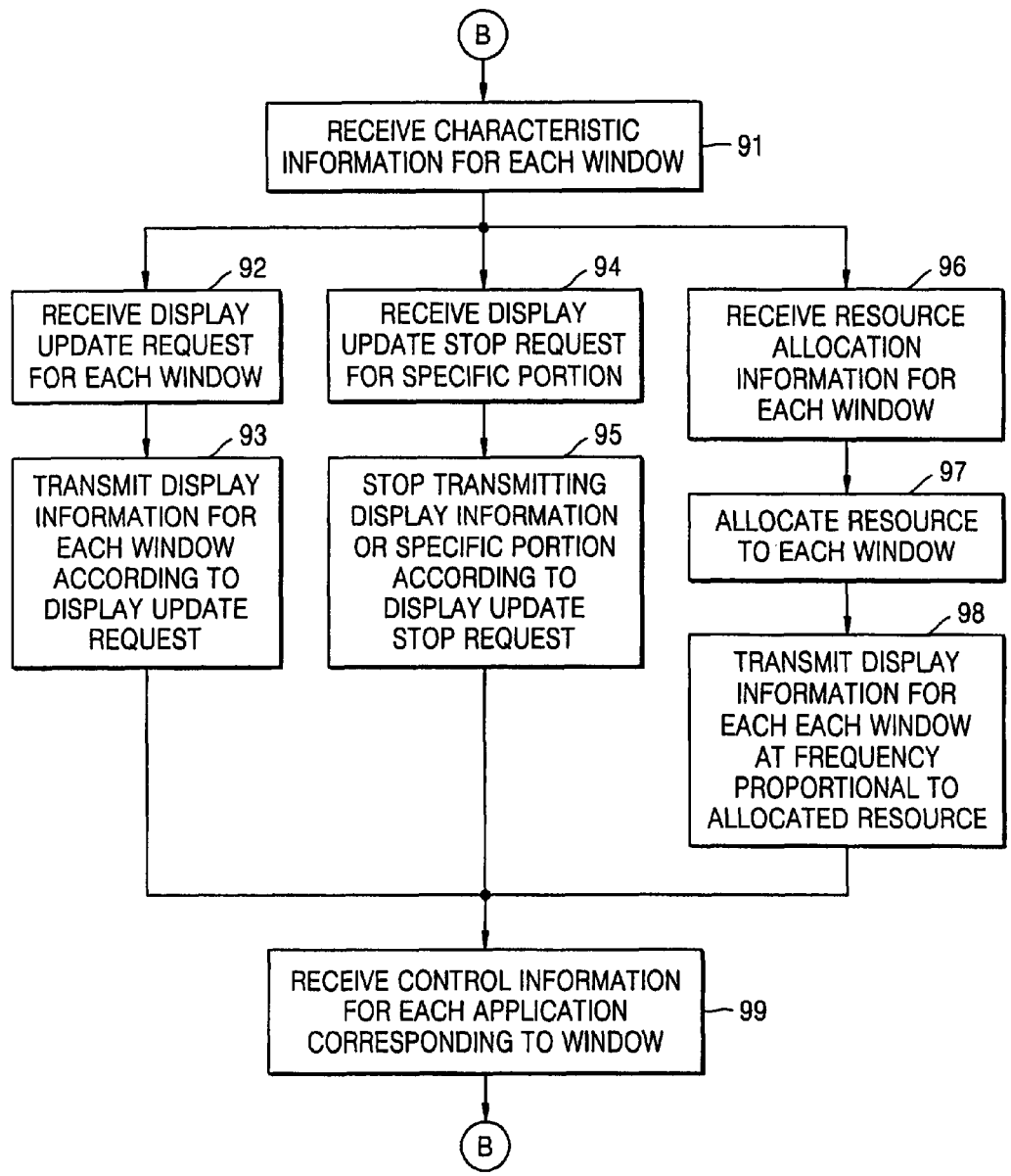
FIG. 9 is a flowchart illustrating a server-side remote controlling method according to an embodiment of the present invention.

FIG. 9 is a flowchart illustrating a server-side remote control method according to an embodiment of the present invention.

Referring to FIG. 9, the server-side remote control method includes multiple operations.

Characteristic information for each window is transmitted to a client in operation 91. Here, a window characteristic information message including a window ID, window variation information, window location information, and window size information is transmitted. Successively, a display update request for each of the windows is received from the client which has received the characteristic information in operation 92. Successively, display information for each of the windows is transmitted in response to the display update request in operation 93. Here, a first display update request message including a first window ID and a display update request for a portion to be updated, and a second display update request message including a second window ID and a display update request for an entire screen are received. Display information for the portion (to be updated) of the first window with the first window ID included in the first display update request message, is transmitted. Also, display information for the entire area of the second window with the second window ID included in the second display update request message, is transmitted.

Also, a display update stop request for a specified specific portion is received from the client that has received the characteristic information in operation 94. Successively, display information transmission for the specified specific portion is stopped in response to the display update stop request in operation 95. Here, a display update stop request message including a location of the specific portion, a size of the specific portion, and a display update stop request is received, and accordingly, display information transmission for the specific portion having the location and size of the specified portion included in the received display update stop request message is stopped.

Also, resource allocation information for each of the windows is received from a client that has received the characteristic information, in operation 96. Successively, a resource is allocated to each of the windows according to the resource allocation information in operation 97. Then, display information for each window with an allocation resource is transmitted in a frequency proportional to the allocated resource in operation 98. Here, a resource allocation information message including a specified window ID and resource allocation information for a window with the window ID is received. Then, a resource is allocated to a window with the window ID included in the received resource allocation information message, according to the resource allocation information included in the received resource allocation information message.

Successively, control information for applications corresponding to the respective windows is received from a client that has received the transmitted display information, in operation 99. Then, the above-described processes are repeated while transmitting characteristic information for the windows corresponding respectively to the applications controlled according to the received control information in operation 91.

Figure 10:
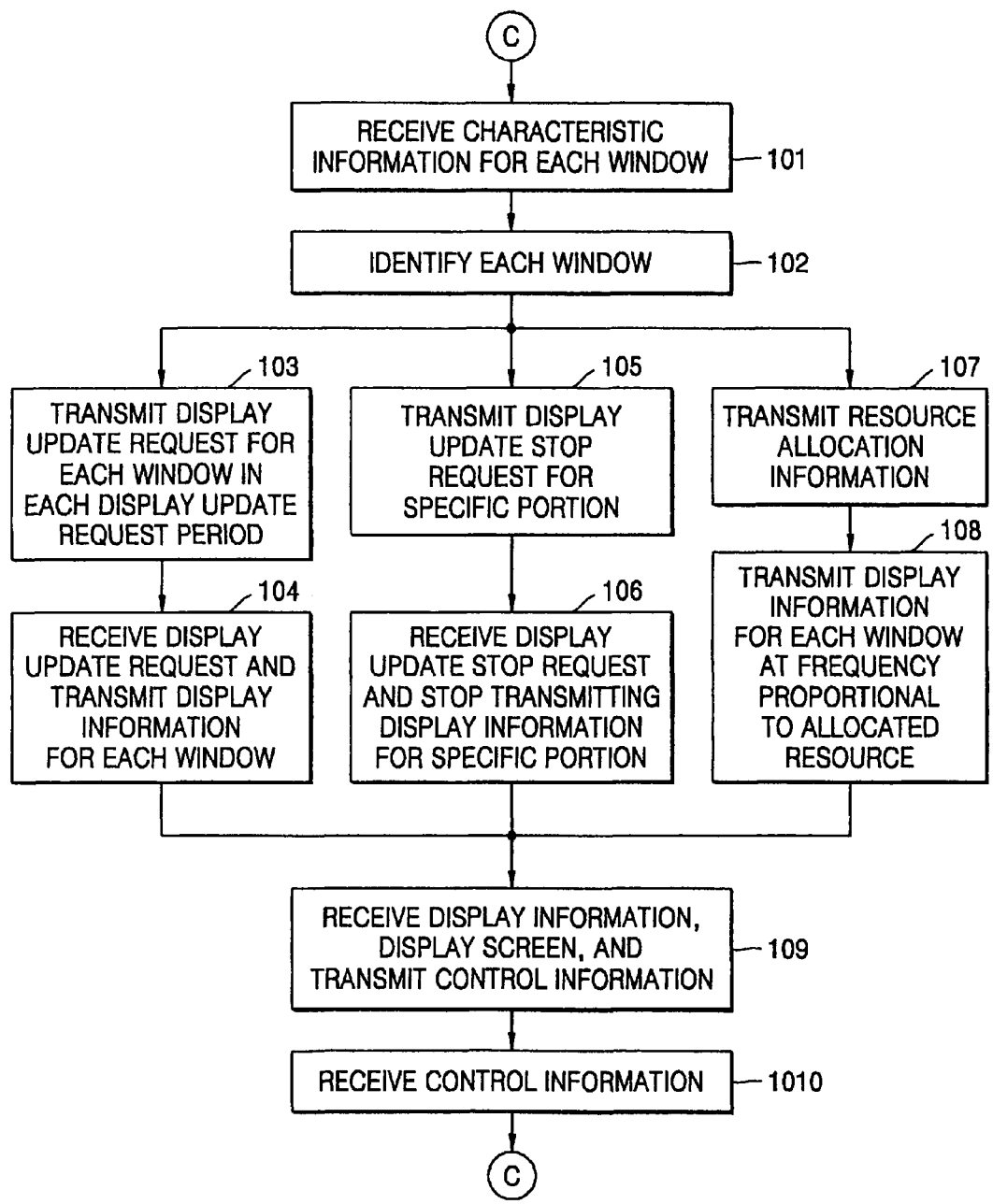
FIG. 10 is a flowchart illustrating a remote controlling method according to an embodiment of the present invention.

FIG. 10 is a flowchart illustrating a remote control method according to an embodiment of the present invention.

Referring to FIG. 10, a remote control method includes multiple operations.

Characteristic information for each window included in a screen displayed on a display panel is transmitted and the transmitted characteristic information is received in operation 101. Next, and each of the windows are identified with reference to the received characteristic information in operation 102. Then, a display update request period for each window is decided with reference to the characteristic information. A display update request for each window is transmitted in each display update request period decided with reference to the characteristic information in operation 103. Then, the display update request is received and display information for each window is transmitted in response to the display update request in operation 104.

Also, a specific portion not requiring display updating for each window is decided with reference to the characteristic information. A display update stop request for the decided specific portion is transmitted in operation 105, then the transmitted display update stop request is received, and then display information transmission for the specific portion is stopped in response to the display update stop request in operation 106.

Also, resource allocation information for the identified windows is received from a user. The received resource allocation information is transmitted in operation 107. Successively, the resource allocation information is received, resources are allocated to each of the windows included in a screen displayed according to the resource allocation information, and then display information for each window with allocated resources is transmitted at a frequency proportional to the allocated resources in operation 108.

Then, the display information transmitted in operation 104 and the display information transmitted in operation 108 are received and a screen including each of the windows is displayed using the received display information. Next, control information for applications corresponding respectively to the windows included in the displayed screen is received from a user and the received control information is transmitted in operation 109. Successively, the transmitted control information is received in operation 1010. The above-described processes are repeated while transmitting characteristic information for the respective windows corresponding to the respective applications controlled according to the received control information in operation 1010.

The present invention may be embodied as a program stored on a computer readable medium that can be run on a general computer. Here, the computer readable medium includes but is not limited to storage media such as magnetic storage media (e.g., ROM's, floppy disks, hard disks, etc.), and optically readable media (e.g., CD-ROMs, DVDs, etc.). The program may be resident on and transmitted through carrier waves (e.g., transmission over the Internet). The present invention may also be embodied as a computer readable program code unit stored on a computer readable medium, for allowing a number of computer systems connected via a network to affect distributed processing.

According to the described embodiments of the present invention, since it is sufficient for a server to transmit only window IDs to a client, without transmitting window location and size information, by allowing the client to identify windows via the window IDs, it is possible to reduce the amount of data transmission when remotely controlling clients via a network. Also, it is possible to remove any inconveniences where the user him/herself needs to designate areas corresponding to each of the windows individually. Furthermore, it is possible to remove any inconveniences where the user needs to redesignate a window area whenever the window area moves to another location. Also, it is possible to provide an optimal display environment according to the types of contents to be reproduced by allowing the client to recognize the types of contents being reproduced in each window. It is also possible to stop display updating for a specific area. Also, by allowing resources to be allocated to each of the windows according to a user's desire, it is possible to frequently perform display updating of windows of higher interest to the user and infrequently perform display updating of windows of lower interest to the user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A client-side remote control method, comprising:
   receiving characteristic information about each of plural windows changed based on control information transmitted from a client, from a server;
   identifying each of the plural windows by referring to a window ID, included in the received characteristic information;
   recognizing types of content being reproduced in each of the identified windows based on window variation information of the characteristic information;
   determining different display update request periods based on different recognized types of content; and
   transmitting display update requests to the server, to update each of the identified windows, for the different display update request periods dependent on the different recognized types of content.

2. The method of claim 1, wherein the characteristic information further includes at least one of a window variation information, window location information, or window size information.

3. The method of claim 2, wherein when each of the plural windows are identified by the window ID, each of the plural windows are identified by the window ID with reference to the window location information and the window size information.

4. The method of claim 2, wherein the transmitting includes:
   checking correlations of the each of the plural windows with reference to the window location information and the window size information; and
   transmitting the display update request based upon the checked correlations.

5. The method of claim 1, further comprising:
   deciding the display update request period for the each of the identified plural windows with reference to the received characteristic information,
   wherein the display update request is transmitted per the decided display update request period.

6. The method of claim 1, further comprising:
   receiving resource allocation information for the each of the identified plural windows from a user; and
   transmitting the received resource allocation information.

7. The method of claim 1, wherein the recognized types of content includes at least one of moving images, still images, repetitively moving images.

8. A client-side remote control method comprising:
   receiving characteristic information about each of plural windows changed based on control information transmitted from a client, from a server;
   identifying each of the plural windows by referring to the received characteristic information;
   recognizing types of content being reproduced in each of the identified windows and determining different display update request periods based on different recognized types of content;
   deciding a specific portion of a screen not requiring display updating for the each of the identified plural windows with reference to the received characteristic information;
   transmitting display update requests to the server, to update each of the identified windows, for the different display update request periods dependent on the different recognized types of content,
   wherein the characteristic information includes at least a window ID; and
   transmitting a display update stop request for the decided specific portion.

9. A server-side remote control method comprising:
   transmitting characteristic information about each of plural windows changed based on control information transmitted from a client, to the client;
   receiving display update requests for different display update request periods for each of the plural windows, based on different recognized types of content for each of the plural windows determined by analyzing variation information of each of the plural windows, from the client which received the transmitted characteristic information; and
   transmitting display information for each of the plural windows according to the received display update requests for different display update request periods,
   wherein the characteristic information includes at least a window ID.

10. The method of claim 9, wherein the characteristic information further includes at least one of a window variation information, window location information, or window size information.

11. The method of claim 9, wherein the display update request includes window ID and the window update information.

12. The method of claim 11, wherein display information corresponding to the window ID and the window update information is transmitted in the transmitting.

13. The method of claim 9, further comprising:
receiving a display update stop request for a specific portion of a screen from the client which received the transmitted characteristic information,
wherein in the transmitting, transmitting display information for the specific portion is stopped in response to the received display update stop request.

14. The method of claim 9, further comprising:
receiving resource allocation information for the each of the plural windows from the client which received the transmitted characteristic information; and
allocating resources to the each of the plural windows according to the received resource allocation information,
wherein in the transmitting, display information for the each of windows is transmitted in a frequency proportional to the allocated resources.

15. A remote control apparatus, comprising:
a server that transmits characteristic information about each of plural windows changed based on received control information included in a screen displayed on a display panel; and
a client that identifies each of the plural windows with reference to a window ID, included in the characteristic information transmitted from the server, and that transmits display update requests for each of the identified windows, the display update requests being transmitted for different display update request periods for each of the identified windows dependent on different types of content being reproduced in each of the identified windows,
wherein the server transmits display information for each of the plural windows in response to the transmitted display update request,
wherein the types of content being reproduced in each of the identified windows are recognized based on window variation information of the characteristic information.

16. The apparatus of claim 15, wherein the characteristic information includes at least one of a window variation information, window location information, and window size information.

17. The apparatus of claim 15, wherein the client decides the display update request period for each of the plural windows with reference to the characteristic information, and transmits a display update request for each of the identified windows per the decided display update request period.

18. The apparatus of claim 15, wherein the client decides a specific portion of the screen not requiring display updating for each of the plural windows with reference to the characteristic information, and transmits a display update stop request for the decided specific portion, and
the server stops transmitting display information for the specific portion in response to the transmitted display update stop request.

19. The apparatus of claim 15, wherein the client receives resource allocation information for each of the plural windows from a user and transmits the received resource allocation information, and
the server allocates resources to each of the plural windows included on a displayed screen according to the transmitted resource allocation information, and transmits display information for each of the plural windows with the allocated resources in a frequency proportional to the allocated resources.

20. The apparatus of claim 15, wherein the recognized types of content includes at least one of moving images, still images, repetitively moving images.

21. A non-transitory computer-readable medium having embodied thereon a computer program for executing a client-side remote control method, comprising:
receiving characteristic information about each of plural windows changed based on control information transmitted from the client, from a server;
identifying each of the plural windows with reference to a window ID, included in the received characteristic information;
recognizing types of content being reproduced in each of the identified windows and determining different display update request periods based on different recognized types of content based on window variation information of the characteristic information; and
transmitting display update requests to the server, to update each of the identified windows, for the different display update request periods dependent on the different recognized types of content.

22. A non-transitory computer-readable medium having embodied thereon a computer program for executing a server-side remote control method, comprising:
transmitting characteristic information for each of plural windows changed based on control information transmitted from a client, to the client;
receiving display update requests for different display update request periods for each of the plural windows, based on different recognized types of content for each of the plural windows determined by analyzing variation information of each of the plural windows, from a client which received the transmitted characteristic information; and
transmitting display information for each of the plural windows in response to the received display update requests for different display update request periods,
wherein the characteristic information includes at least a window ID.

23. A system which reduces an amount of data transmission during remote controlling via a network, comprising:
a client that identifies at least one changed window using at least one window identifier based on control information transmitted from the client, that analyzes variation information of each of the plural windows to recognize different types of content reproduced in each identified window, and that transmits display update requests for each identified window, the display update requests being transmitted for different display update request periods for each of the identified windows dependent on different types of content; and
a server which transmits the at least one window identifier to the client receives at least one display update request from the client, and transmits display information according to the received at least one display update request.

24. A remote control method, comprising:
transmitting characteristic information for each of one or more windows;
identifying each of the windows by referring to a window ID, included in the received characteristic information;
analyzing variation information of each of the plural windows to recognize different types of content being reproduced in each of the identified windows;

transmitting display update requests for each window in each display update request period based on the characteristic information, the display update requests being transmitted for different display update request periods for each of the identified windows dependent on the different types of content;

receiving the display update request and transmitting first display information for each window in response to the display update request;

transmitting a display update stop request for a decided specific portion;

stopping display information transmission for the specific portion in response to the display update stop request;

transmitting received resource allocation information;

transmitting second display information for each window with allocated resources is transmitted at a frequency proportional to the allocated resources;

receiving the first and the second display information and displaying a screen including each of the windows using the received display information; and receiving and transmitting control information for applications corresponding respectively to the displayed windows.

25. A method of reducing an amount of data transmission during remote control of clients via a network, comprising:

receiving characteristic information about each of plural windows changed based on control information transmitted from a client;

identifying each of the plural windows by referring to a window ID, included in the received characteristic information;

analyzing variation information of each of the plural windows to recognize different types of content being reproduced in each of the identified windows;

transmitting display update requests for each of the identified windows, the display update requests being transmitted for different display update request periods for each of the identified windows dependent on the different types of content;

transmitting characteristic information for each of the plural windows;

receiving a display update request for each of the plural windows; and transmitting display information for each of the plural windows according to the received display update request.

26. A method of allocating resources to plural display windows based on a user input, comprising:

receiving characteristic information for each of plural windows;

identifying each of the plural windows by referring to a window ID, included in the received characteristic information;

recognizing types of content being reproduced in each of the identified windows based on window variation information of the characteristic information;

transmitting a display update request for each of the identified windows;

transmitting characteristic information for each of the plural windows;

receiving a display update request for each of the plural windows; and transmitting display information for each of the plural windows according to the received display update request, wherein, based on the user input and the types of content recognized, display update requests for at least one of the identified windows are transmitted for different display update request periods for each of the identified windows dependent on the different types of recognized content.

* * * * *